July 3, 1923.
B. LIEBOWITZ
FLEXIBLE JOINT
Filed Nov. 26, 1921
1,460,817
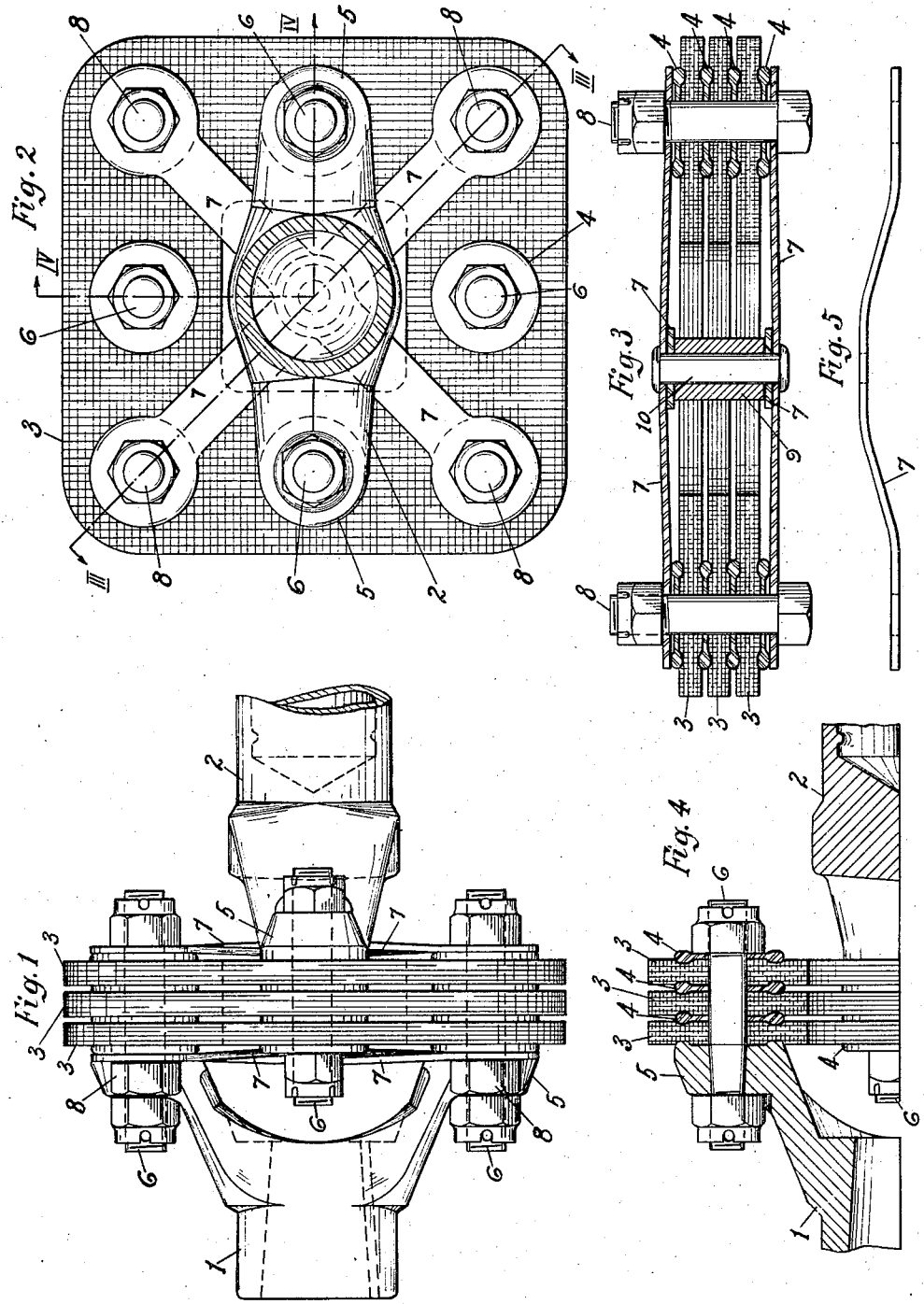
INVENTOR.
Benjamin Liebowitz
BY
ATTORNEY Patented July 3, 1923.

1,460,817

UNITED STATES PATENT OFFICE.

BENJAMIN LIEBOWITZ, OF NEW ROCHELLE, NEW YORK.

FLEXIBLE JOINT.

Application filed November 26, 1921. Serial No. 517,942.

*To all whom it may concern:*

Be it known that I, BENJAMIN LIEBOWITZ, a citizen of the United States, and a resident of the city of New Rochelle, in the county of Westchester and State of New York, have invented certain new and useful Improvements in Flexible Joints, of which the following is a specification.

This invention relates to joints employing flexible material, and particularly to universal joints applicable to propeller shafts of automobiles and motor trucks.

Joints of this kind in use at the present time have a comparatively short life, due to the stretching strains imposed upon the fabric disks by the angular and endwise movements. It is the primary object of my invention to increase the life of the disks, and to provide greater flexibility, by imposing less stretching strains on the disks due to given angular and end motions. Also I achieve other objects, as may be hereinafter brought out.

I accomplish these objects as well as others, by means of the construction illustrated in the accompanying drawings, in which, Fig. 1 is an end elevation, Fig. 2 is a side elevation, Fig. 3 is a section on the line III—III of Fig. 2 with the yokes omitted for clearness, Fig. 4 is a section on the line IV—IV of Fig. 2 with the diagonals omitted for clearness, and Fig. 5 is a detail of a diagonal prior to assembly to the fabric.

Referring to the drawings, 1 and 2 are a pair of yokes or spiders which are symmetrically coupled together by means of a flexible fabric member made up of fabric squares 3. Present practice generally is to employ a 3-arm yoke or spider but I employ preferably a 2-arm yoke. Any number of fabric members 3, of course, may be employed, but I prefer to use three.

As in conventional or approved practice, the fabric members 3 are separated by washers 4 and are fastened to lugs 5 on the yokes 1 and 2 in any suitable manner, as by bolts 6. It will be noted that in the embodiment shown, the fabric members are substantially square-shaped and the yokes are fastened at the mid-points of the sides of the squares.

The use of a 2-arm spider in place of the conventional 3-arm spider increases the buckling tendencies in the fabric members due to the driving forces. To eliminate or minimize these, and to improve the accuracy of centering of the joint, I employ struts or diagonals 7 secured to the fabric members 3 at the corners by means of bolts 8. For convenience in manufacture, and in order to obtain maximum strength, I prefer to use diagonals of the form shown; that is, I prefer not to make them one piece, but to punch them individually out of strips and fasten them together at the center by means of the spacer 9 and bolt or rivet 10.

In order to still further reduce the buckling tendencies and improve the accuracy of centering, I prefer to place the fabric members under initial tension. The simplest way to do this is to use diagonals which are slightly curved lengthwise intermediate their ends as shown in Fig. 5, and so somewhat flatten the curvature in fastening them to the fabric members. This flattening process in the assembly elongates the diagonals and hence puts initial tension in the fabric squares.

With this construction it will be seen that the tension in the fabric members set up by the driving torque, assuming yoke 1 to be the driving member, does not act directly from bolt 6 on yoke 1 to bolt 6 on yoke 2 through the fabric on the bias, but goes from bolt 6 of yoke 1 to bolt 8 of the diagonal, and thence from bolt 8 to bolt 6 on the yoke 2; hence the tension is always parallel to the sides of the square (which tension sets up compression stresses in the diagonals 7).

For this reason I prefer to make the fabric squares so that the threads all run parallel to the sides of the squares, and not to stagger them. In order to eliminate any slight difference between the warp and the filler of the fabric, I may so lay the plies in building up the fabric squares that the warp in one layer is parallel to the filler of the next, etc. The plies are bound together into a homogeneous mass by frictioning material, as in conventional practice.

It will be noted as shown in Figs. 1 and 3 that the portions of the struts or diagonals 7 intermediate the bolts 8 are not perfectly flat but are slightly bent or curved after assembly. I prefer to do this to obtain endwise flexibility in the diagonals in order to relieve the fabric of some of the distortional stresses. Also I form these diagonals relatively thin and wide, so that they can "weave" easily, and therefore conform better to the fabric when distorted by angular or end motion. Of course I may increase the endwise flexibility, if desired, by increasing the amount of curvature or bend in the diagonals, or by corrugating them.

It will be seen that due to the reduced number of arms which I employ in the spider, there is less stretching action on the fabric member caused by angular motions or end motions of the joint. Another advantage of my construction is that there is practically no waste of raw material in cutting out the fabric members, which are square instead of round, as in the conventional designs. Another advantage is that the load is transmitted always along the threads of the fabric, none of the load being taken at an angle to the threads; therefore, there is no material loss of strength in my construction due to the higher bolt loads incident to the use of a small number of arms in the spider.

My invention is not to be construed as limited to the specific embodiments shown.

I claim:

1. In a flexible joint of the character described, the combination with a flexible member and a pair of yoke members fastened thereto, of strut members fastened to said flexible member at points intermediate the points of attachment of said yoke members.

2. In a flexible joint of the character described, the combination of a flexible member, a pair of yoke members fastened thereto, and strut members fastened to said flexible member at points intermediate the points of attachment of said yoke members, said flexible member being under initial tension due to initial compression in said strut members.

3. In a flexible joint of the character described, the combination of a pair of yoke members, a substantially square shaped fabric member, said yoke members being each fastened to said fabric member at opposite mid-points of the sides of the square, and strut members fastened to said fabric member at the corners.

4. In a flexible joint of the character described, a pair of two-armed spiders, the arms of one spider being perpendicular to the arms of the other spider, a substantially square shaped fabric member coupling said spiders, the points of attachment being the mid-points of the sides of the square, and diagonal strut members fastened to said fabric member near its corners.

5. In a flexible joint of the character described, a pair of two-armed spiders, the arms of one spider being perpendicular to the arms of the other spider, a substantially square shaped fabric member coupling said spiders, the points of attachment being the mid-points of the sides of the square, and flexible diagonal strut members fastened to said fabric member near its corners.

6. In a flexible joint of the character described, a pair of two-armed spiders, the arms of one spider being perpendicular to the arms of the other spider, a substantially square shaped fabric member coupling said spiders, the points of attachment being the mid-points of the sides of the square, the warp and filler threads of said fabric member running substantially parallel with the sides of the square, and flexible diagonal strut members fastened to said fabric member near its corners.

BENJAMIN LIEBOWITZ.